ＵＳ００９７７１１０２Ｂ２

United States Patent
Sakurai

(10) Patent No.: US 9,771,102 B2
(45) Date of Patent: Sep. 26, 2017

(54) STEER-BY-WIRE STEERING REACTION FORCE CONTROL DEVICE

(71) Applicant: NTN CORPORATION, Osaka (JP)

(72) Inventor: Ryou Sakurai, Iwata (JP)

(73) Assignee: NTN CORPORATION, Osaka (JP)

( * ) Notice: Subject to any disclaimer, the term of this patent is extended or adjusted under 35 U.S.C. 154(b) by 8 days.

(21) Appl. No.: 14/424,834

(22) PCT Filed: Aug. 26, 2013

(86) PCT No.: PCT/JP2013/072692
§ 371 (c)(1),
(2) Date: Feb. 27, 2015

(87) PCT Pub. No.: WO2014/034597
PCT Pub. Date: Mar. 6, 2014

(65) Prior Publication Data
US 2015/0232122 A1    Aug. 20, 2015

(30) Foreign Application Priority Data
Aug. 31, 2012    (JP) .................................. 2012-191062

(51) Int. Cl.
*B62D 6/00*    (2006.01)

(52) U.S. Cl.
CPC .................... *B62D 6/008* (2013.01)

(58) Field of Classification Search
None
See application file for complete search history.

(56) References Cited

U.S. PATENT DOCUMENTS

| 6,032,757 A * | 3/2000 | Kawaguchi ............ B62D 6/002 180/197 |
| 6,213,248 B1 * | 4/2001 | Kawaguchi ............ B62D 6/008 180/402 |

(Continued)

FOREIGN PATENT DOCUMENTS

| JP | 10-258748 | 9/1998 |
| JP | 10-258750 | 9/1998 |

(Continued)

OTHER PUBLICATIONS

English Translation of the Written Opinion of the International Searching Authority mailed Mar. 12, 2015 for corresponding International Patent Application No. PCT/JP2013/072692.

(Continued)

*Primary Examiner* — Jean-Paul Cass

(57) ABSTRACT

In this steer-by-wire steering reaction force control device, a steering controller is provided with: a turning reaction force estimation unit configured to calculate an estimated value of a turning reaction force or a parameter representing vehicle behavior from a vehicle motion model; and a comparison unit configured to compare the estimated value calculated by the turning reaction force estimation unit with a value detected by a turning reaction force sensor, and configured to select either one of the estimated value and the detected value in accordance with a predetermined condition. Further, a steering reaction force generation unit is provided that is configured to use the estimated value or the detected value selected by the comparison unit for generation of a steering reaction force.

6 Claims, 5 Drawing Sheets

(56) References Cited

U.S. PATENT DOCUMENTS

| | | | | |
|---|---|---|---|---|
| 6,481,526 B1* | 11/2002 | Millsap | | B62D 5/006 180/402 |
| 6,484,839 B2* | 11/2002 | Cole | | B62D 5/001 180/402 |
| 6,554,095 B2* | 4/2003 | Zheng | | B62D 5/003 180/402 |
| 6,634,454 B2* | 10/2003 | Sugitani | | B62D 1/12 180/333 |
| 6,655,490 B2* | 12/2003 | Andonian | | B62D 5/006 180/402 |
| 6,678,597 B2* | 1/2004 | Amberkar | | B62D 5/001 180/402 |
| 6,705,424 B2* | 3/2004 | Ogawa | | B62D 1/163 180/444 |
| 6,712,175 B2* | 3/2004 | Kind | | B62D 5/005 180/402 |
| 6,899,196 B2* | 5/2005 | Husain | | B62D 5/005 180/402 |
| 6,983,816 B2* | 1/2006 | Takahashi | | B62D 5/006 180/402 |
| 7,036,445 B2* | 5/2006 | Kaufmann | | B63B 39/061 114/144 RE |
| 7,100,733 B2* | 9/2006 | Zhao | | B62D 5/006 180/402 |
| 7,175,133 B2* | 2/2007 | Tanaka | | F15B 18/00 244/99.4 |
| 7,207,411 B2* | 4/2007 | Duits | | B66F 9/07568 180/402 |
| 7,664,584 B2* | 2/2010 | Chino | | B62D 5/003 180/204 |
| 7,905,313 B2* | 3/2011 | Odate | | B60R 21/0134 180/268 |
| 8,397,883 B2* | 3/2013 | St. Clair | | F16D 57/002 188/161 |
| 2006/0015231 A1* | 1/2006 | Yoshimura | | B60K 6/46 701/48 |
| 2010/0023213 A1* | 1/2010 | Mizuno | | B60G 3/26 701/37 |
| 2012/0062375 A1* | 3/2012 | Takeuchi | | B60W 50/085 340/441 |
| 2015/0266501 A1* | 9/2015 | Kojo | | B62D 6/008 701/41 |
| 2016/0264135 A1* | 9/2016 | Yamakado | | B60T 7/12 |

FOREIGN PATENT DOCUMENTS

| | | |
|---|---|---|
| JP | 2000-108914 | 4/2000 |
| JP | 2001-301638 | 10/2001 |
| JP | 2004-161198 | 6/2004 |
| JP | 2004-338616 | 12/2004 |
| JP | 2007-237938 | 9/2007 |

OTHER PUBLICATIONS

Japanese Office Action dated Jan. 19, 2016 in corresponding Japanese Patent Application No. 2012-191062.
Japanese Notification of Reasons for Rejection dated Dec. 20, 2016 from Japanese Patent Application No. 2016-045191, 4 pages.
Japanese Decision of Rejection dated Apr. 4, 2017 from Japanese Patent Application No. 2016-045191, 3 pages.
International Search Report mailed on Nov. 12, 2013 in corresponding International Patent Application No. PCT/JP2013/072692.

* cited by examiner

STEER-BY-WIRE STEERING REACTION FORCE CONTROL DEVICE

CROSS REFERENCE TO THE RELATED APPLICATION

This application is a U.S. National Stage Application, which claims the benefit under 35 U.S.C. §371 of PCT International Patent Application No. PCT/JP2013/072692, filed Aug. 26, 2013, which is based on and claims the foreign priority benefit under 35 U.S.C. §119 of Japanese Patent Application No. 2012-191062, filed Aug. 31, 2012, the entire disclosures of which are herein incorporated by reference as a part of this application.

BACKGROUND OF THE INVENTION

Field of the Invention

The present invention relates to a steering reaction force control device for a steer-by-wire type steering device configured to perform steering by use of a steering wheel which is not mechanically connected to a tie rods-connecting shaft for turning.

Description of Related Art

To date, there have been proposed steer-by-wire type steering devices that are configured to perform steering by use of a steering wheel which is not mechanically connected to a tie rods-connecting shaft. For such steer-by-wire type steering devices, with respect to methods for generating a steering reaction force to be provided to the steering wheel, there have been disclosed a technology (Patent Document 1) for detecting a turning reaction force acting on a turning mechanism by means of a turning reaction force sensor, and a technology (Patent Document 2) for generating a turning reaction force by use of obtained values (the yaw rate, the lateral acceleration, the turning reaction force) indicating the behavior state of the vehicle, in addition to the steering angle, the steering angle velocity, and the steering angle acceleration.

In another steering device adopting an EPS system or the like in which a steering unit including the steering wheel is mechanically connected to a turning mechanism unit for changing the orientations of the tires, in calculation of an assist torque to be provided to the steering torque caused by rotational operation of the steering wheel, a vehicle motion model is used to change the steering feeling (Patent Document 3).

RELATED ART DOCUMENT

Patent Document

[Patent Document 1] JP Laid-open Patent Publication No. H10-258748
[Patent Document 2] JP Laid-open Patent Publication No. 2000-108914
[Patent Document 3] JP Laid-open Patent Publication No. 2004-338616

SUMMARY OF THE INVENTION

In conventional steering devices adopting EPS systems, the friction force in each mechanism units is directly felt as the steering reaction force. On the other hand, in a steer-by-wire system, since there is no mechanical connection between the steering unit and the turning mechanism unit, the steering reaction force is generated by a steering reaction force actuator provided in the steering unit. For generation of the steering reaction force, there have been known a method in which a reaction force is generated based on a value obtained by a turning reaction force sensor provided in the turning mechanism unit, and a method in which a reaction force is generated by use of obtained values (the yaw rate, the lateral acceleration, the turning shaft force, and the like) indicating the behavior state of the vehicle, in addition to the steering angle, the steering angle velocity, and the steering angle acceleration. However, such values obtained by sensors used in generation of these reaction forces include high frequency components under the influence of vibration due to unevenness of the road surface, individual differences of alignment of the left and right wheels, and the like, which results in impaired steering feeling.

In Patent Document 1, high frequency components are attenuated by causing the signal obtained from the turning reaction force sensor to pass through a lowpass filter. However, by causing the signal to pass through the lowpass filter, a time lag occurs and there is a high possibility of the control system becoming unstable.

In Patent Document 2, the obtained values indicating the behavior state of the vehicle are used as they are, and thus, it is considered that the steering feeling is impaired depending on the situation under the influence of high frequency components.

An object of the present invention is to provide a steer-by-wire steering reaction force control device having a stable steering reaction force which is free from influence of high frequency components included in values obtained by sensors and the like used in generation of a steering reaction force, and which realizes comfortable steering feeling based on the behavior state of the vehicle and the road surface state.

In order to facilitate understanding, the following description will be given by use of the reference numerals used in the embodiment described later. A steer-by-wire steering reaction force control device according to the present invention is a steer-by-wire steering reaction force control device in a steer-by-wire type steering device, the steer-by-wire type steering device including: a steering angle sensor 14 configured to detect a steering angle of a steering wheel 1 that is not mechanically connected to a tie rods-connecting shaft 6 for turning; a steering reaction force motor 13 configured to provide a steering reaction force to the steering wheel 1; and a steering controller 16 configured to generate a command signal for a turning angle by combining the steering angle detected by the steering angle sensor 14 with driving state detection signals from other sensors 11 provided in a vehicle, so as to control a turning motor 15 of a turning mechanism 7 that drives the tie rods-connecting shaft 6, in which the steering controller 16 is provided with: a turning reaction force estimation unit 17 configured to calculate an estimated value of a turning reaction force based on a vehicle motion model 20; a comparison unit 18 configured to compare the estimated value of the turning reaction force calculated by the turning reaction force estimation unit 17 with a detected value detected by a turning reaction force sensor 8 that detects a turning reaction force acting on the turning mechanism 7, so as to select either one of the estimated value and the detected value in accordance with a predetermined condition; and a steering reaction force generation unit 19 configured to use the estimated value or the detected value selected by the comparison unit 18 for generation of a steering reaction force.

According to this configuration, the steering angle sensor 14 detects the steering angle, and a sensor which detects the turning reaction force, i.e., the turning reaction force sensor 8, detects the turning reaction force acting on the turning mechanism 7. The other sensors 11 detect the driving state. The steering controller 16 generates a command signal for a turning angle by combining the steering angle with driving state detection signals, to control the turning motor 15. The turning reaction force estimation unit 17 in the steering controller 16 calculates an estimated value of a turning reaction force from the vehicle motion model 20 based on equations of motion of the vehicle. For example, when the vehicle speed is greater than or equal to a certain value, the estimated value of the turning reaction force calculated from the vehicle motion model 20 is used. When the vehicle speed is less than the certain value, the turning reaction force detected by the turning reaction force sensor 8 is used.

The comparison unit 18 in the steering controller 16 compares the calculated estimated value of the turning reaction force with the value detected by the turning reaction force sensor 8, and selects either one of the estimated value and the detected value in accordance with a predetermined condition. As the "predetermined condition", for example, when the vehicle speed is greater than or equal to a predetermined value, and when the difference between the estimated value and the detected value is less than or equal to a threshold value Fs, the estimated value from the vehicle motion model 20 is adopted and the turning reaction force term is obtained. The "threshold value Fs" is set such that the estimated value is adopted in normal steering, with estimation errors allowed. When the estimated value from the vehicle motion model 20 is adopted when the vehicle speed is greater than or equal to the predetermined value in this manner, high frequency components due to influence of vibration are not included.

When the difference between the estimated value and the detected value is greater than the threshold value Fs, the turning reaction force detected by the turning reaction force sensor 8 is used. For example, only in emergency where the estimated value is clearly and greatly different from the detected value, the turning reaction force being the actual value detected by the turning reaction force sensor 8 is used. In a case where the turning reaction force is to be used when the vehicle speed is less than the certain value or in emergency where the estimated value is clearly and greatly different from the detected value as described above, the signal representing the value obtained from the turning reaction force sensor 8 is caused to pass through a lowpass filter, for example, to attenuate high frequency components included in the signal, and then, the turning reaction force term is calculated. Meanwhile, when the vehicle speed is less than a predetermined value as in the case of so-called steering without driving of the steering wheel 1, the movement of the steering without driving is slow movement of less than or equal to 0.5 Hz, for example. Thus, time lag caused by the lowpass filter does not pose a problem.

The steering reaction force generation unit 19 uses the estimated value or the detected value selected by the comparison unit 18, in generation of a steering reaction force as the turning reaction force term. For generation of the steering reaction force, the turning reaction force term is used, and in addition, a spring factor proportional to the steering angle, a viscosity factor proportional to the steering angle velocity, an inertia factor proportional to the steering angle acceleration, and a friction factor are used, for example. Since the steering angle, the steering angle velocity, and the steering angle acceleration can be obtained by the steering angle sensor 14 provided near the steering wheel, high frequency components due to vibration caused by the spring are not included therein. Thus, it is possible to realize a steer-by-wire type steering device having a stable steering reaction force which is free from influence of high frequency component included in the obtained values from the sensors and the like used for generation of the steering reaction force, and which realizes comfortable steering feeling based on the behavior state of the vehicle and the road surface state.

The predetermined condition may be such that when the vehicle speed is greater than or equal to a predetermined value and when a difference between the estimated value and the detected value is less than a threshold value, the comparison unit 18 may select the estimated value from the vehicle motion model 20, and when the condition of the vehicle speed and the difference is not satisfied, the comparison unit 18 may select the detected value. The predetermined value can be obtained as appropriate by simulation, experiments, and the like.

The tie rods-connecting shaft 6 or tie rods 5 may be provided with the turning reaction force sensor 8. According to this configuration, the feeling realized by the steer-by-wire type steering device can be made close to the feeling realized by an EPS system in which the steering wheel is mechanically connected to the tie rods-connecting shaft.

The steering reaction force generation unit 19 may estimate, based on the vehicle motion model 20, any of a yaw rate, a roll rate, a yaw angle, a roll angle and a lateral acceleration, as a parameter representing vehicle behavior, to use the selected one as the estimated value. The vehicle behavior term is obtained by multiplying the selected parameter representing vehicle behavior with its corresponding coefficient. In this case, vehicle behavior which could not be obtained by a conventional steer-by-wire type steering device can be outputted while being reflected in the turning reaction force. Thus, a steering device in accordance with the preference of the operator, the type of the vehicle, and the like can be realized.

The steering reaction force generation unit 19 may use any of a spring component proportional to the steering angle, a viscosity component proportional to a steering angle velocity, an inertia component proportional to a steering angle acceleration, and a friction component for generation of the steering reaction force. In this case, it is possible to prevent uncomfortable feeling at the time of operation of the steering wheel, vibration, and the like, and it is also possible to obtain response similar to that in the case of a conventional steering device adopting an EPS system or the like.

The steering reaction force generation unit 19 may alter the steering reaction force in response to a vehicle speed. For example, by varying the steering reaction force such that the steering reaction force in a high speed range is greater than the steering reaction force in medium and low speed ranges, it is possible to obtain a more stable steering reaction force in the high speed range, and it is possible to obtain a steering reaction force that facilitates operation even with a small force in the medium and low speed ranges.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A first embodiment of the present invention will be described with reference to FIG. 1 to FIG. 3. The following description also includes description of a steer-by-wire steering reaction force control method.

Figure 1:
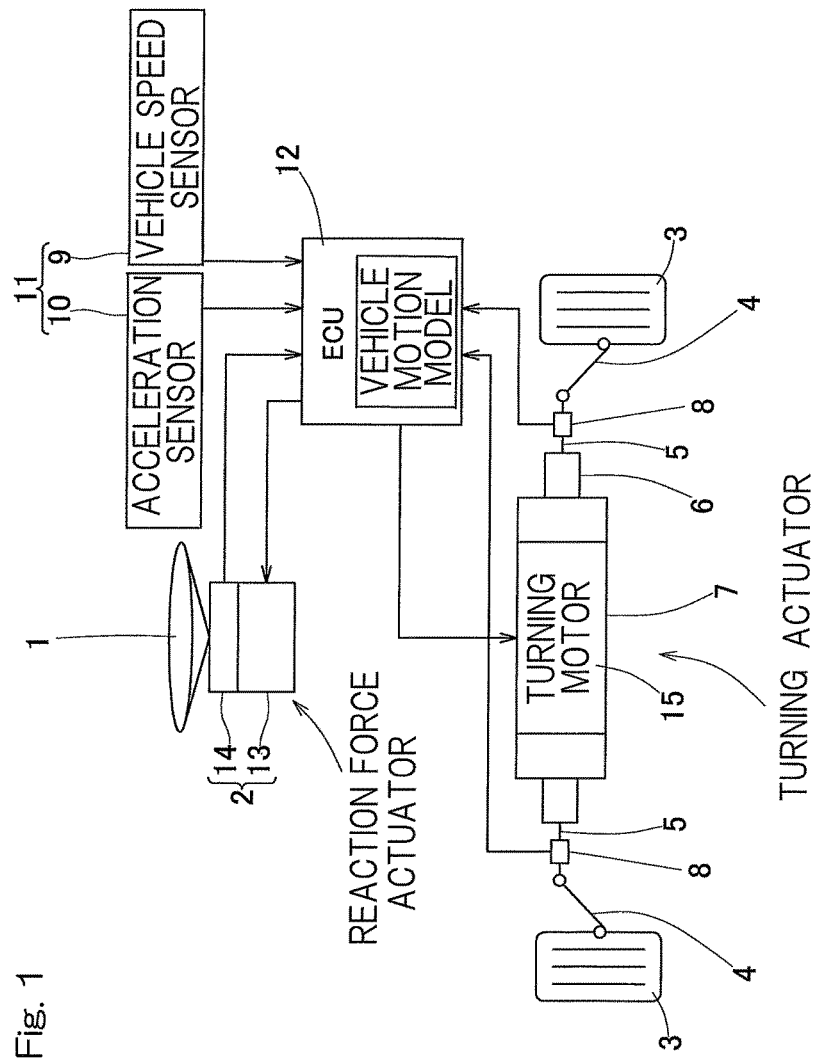
FIG. 1 illustrates a schematic configuration of a steer-by-wire type steering device including a steering reaction force control device according to a first embodiment of the present invention and a conceptual configuration of a control system thereof.

FIG. 1 illustrates a schematic configuration of a steer-by-wire type steering device including a steering reaction force control device according to the present embodiment and a conceptual configuration of a control system thereof. As shown in FIG. 1, the steer-by-wire type steering device includes a steering wheel 1, a steering mechanism 2, a tie rods-connecting shaft 6 for turning connected to left and right steered wheels 3, 3 via respective knuckle arms 4 and tie rods 5, a turning mechanism 7, turning reaction force sensors 8, other sensors 11 such as a vehicle speed sensor 9, an acceleration sensor 10 and the like, and an ECU (electrical control unit) 12 as a steering reaction force control device. The ECU 12 includes steering controller described later and is comprised of electronic circuitry and the like including a microcomputer and its control program.

The steering mechanism 2 includes a steering reaction force motor 13 which provides a steering reaction force to the steering wheel 1 that is not mechanically connected to the tie rods-connecting shaft 6 for turning and a steering angle sensor 14 which detects the steering angle of the steering wheel 1.

The turning mechanism 7 includes a turning motor 15 which drives the tie rods-connecting shaft 6. The turning motor 15 transmits its rotation to the tie rods-connecting shaft 6, as a movement in the axial direction. Each turning reaction force sensor 8, which is configured to detect a turning reaction force acting on the turning mechanism 7, is implemented by a load cell, a load sensor, or the like, for example, and is provided to its corresponding tie rod 5, for example. In this case, when the turning motor 15 is rotated, each tie rod 5 is moved in the axial direction, while each turning reaction force sensor 8 detects the force in the axial direction applied to the tie rod 5 as a displacement of a portion supporting the load, and converts the detected force into an electric signal. It should be noted that, in this example, the turning reaction force sensors 8, 8 are provided in the tie rods 5, 5, respectively, but the turning reaction force sensor 8 may be provided only in one of the tie rods 5. Alternatively, the turning reaction force sensor 8 may be provided in the tie rods-connecting shaft 6.

Figure 2:
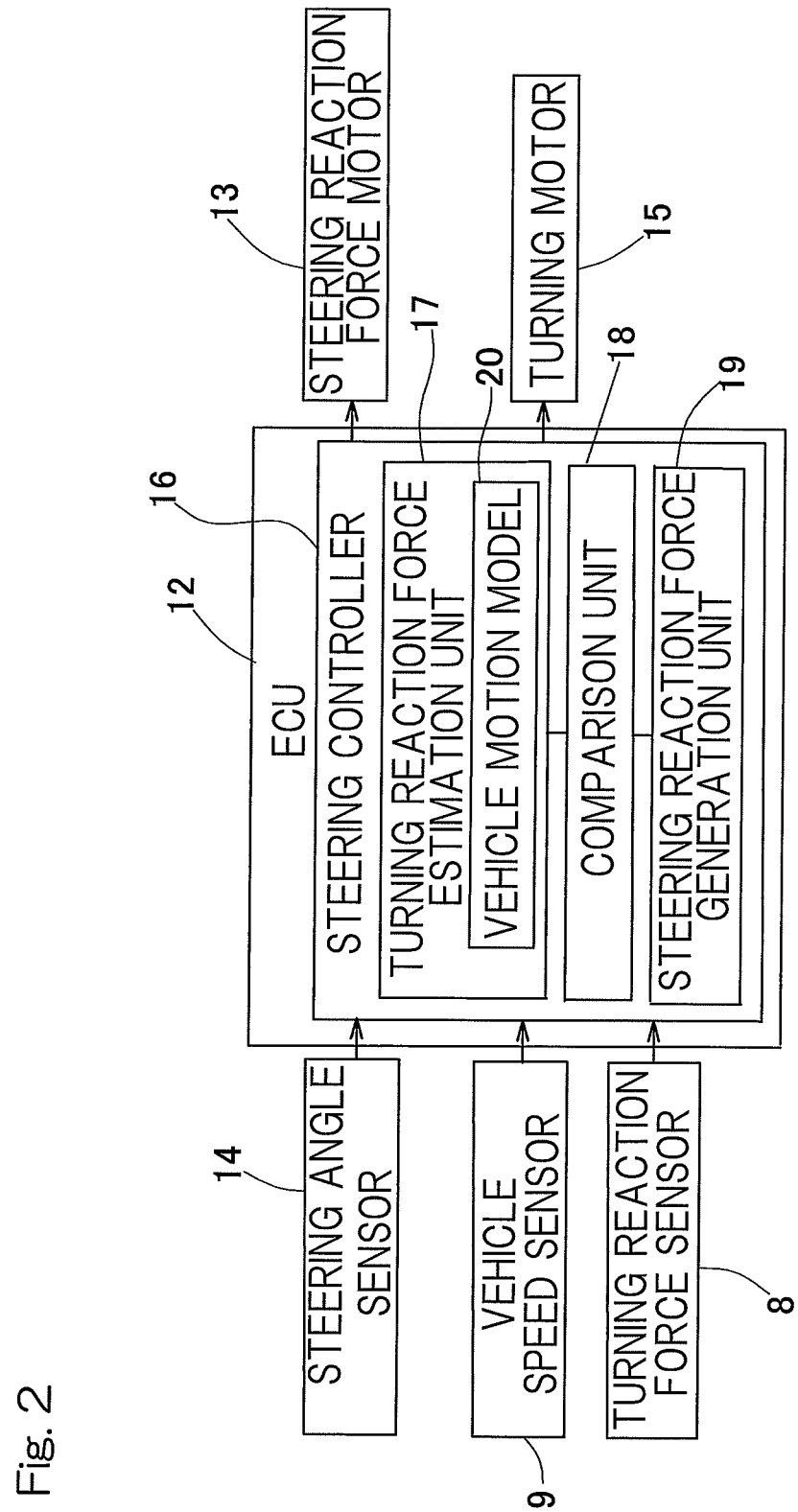
FIG. 2 is a block diagram of the control system of the steering reaction force control device.

FIG. 2 is a block diagram showing the control system of this steering reaction force control device. As shown in FIG. 2, a steering controller 16 of the ECU 12 includes a turning reaction force estimation unit 17, a comparison unit 18, and a steering reaction force generation unit 19. The turning reaction force estimation unit 17 calculates an estimated value of a turning reaction force from a vehicle motion model 20 based on equations of motion of a vehicle. The comparison unit 18 compares the estimated value of the turning reaction force calculated by the turning reaction force estimation unit 17 with a detected value detected by the turning reaction force sensor 8, so as to select either one of the estimated value and the detected value, in accordance with a predetermined condition. The steering reaction force generation unit 19 uses the estimated value or the detected value selected by the comparison unit 18, in generation of a steering reaction force.

The vehicle motion model 20 has been structured under the following assumption. When the advancing direction of the vehicle is defined as an X-axis direction, the width direction of the vehicle is defined as a Y-axis direction, and the up-down direction of the vehicle is defined as a Z-axis direction, the model is a model having three degrees of freedom describing the motion in the Y-axis direction, about the Z axis (yaw), and about the X axis (roll), the model is a four-wheel vehicle model in order to take differences between the lateral forces acting on the left and right wheels into consideration, the direction of the lateral force on a tire is parallel to the orientation of the Y axis, and the vehicle moves in the X-axis direction (forward) at a constant speed V.

From the above assumption, the equation of motion with respect to translation in the Y-axis direction in this model is expressed by the following equation.

$$mV(\dot{\beta}+\dot{\phi})=F_{fL}+F_{fR}+F_{rL}+F_{rR} \quad (1)$$

where m represents the mass of the vehicle, F represents the lateral force acting on each tire, $\beta$ represents the angle of sideslip of the vehicle body and $\psi$ with a dot above the letter represents the yaw angular velocity.

With respect to the subscript of the lateral force F, the first letter refers to the front or rear, and the second letter refers to the left or right. For example, $F_{fL}$, refers to the lateral force acting on the front left wheel.

Similarly, the equation of motion with respect to the rotation (yawing) about the Z axis is expressed by the following equation.

$$I_z\ddot{\psi}+I_{xz}\ddot{\phi}=I_f(F_{fL}+F_{fR})-I_r(F_{rL}+F_{rR}) \quad (2)$$

where $I_z$ represents the yaw moment of inertia, $I_{xz}$ represents the yaw-roll product of inertia, $I_f$ and $I_r$ represent the distance from the center of gravity of the vehicle to the front axle and to the rear axle, respectively and φ represents the roll angle.

The equation of motion with respect to rotation (rolling) about the X axis is expressed by the following equation.

$$I_X\ddot{\phi}+C_\phi\dot{\phi}+(K_\phi-mgh_C)\phi+I_{XZ}\ddot{\phi}=h_f(F_{fL}+F_{fR})+h_r(F_{rL}+F_{rR}) \quad (3)$$

where $I_X$ represents the roll moment of inertia, $C_\phi$ represents the roll attenuation coefficient, and $K_\phi$ represents the roll rigidity. The roll moment arm length $h_c$ at the point of the center of gravity of the vehicle is expressed by the following equation, by use of the roll moment arm lengths $h_f$ and $h_r$ at the front axle and rear axle.

$$h_c = \frac{h_f l_r + h_r l_f}{l_f + l_r} \quad (4)$$

By solving the three coupled equations of motion and obtaining the angle of sideslip of the vehicle body β, the yaw angular velocity (ψ with a dot above the letter), the roll angle φ, and the lateral force F, it is possible to grasp the state of the motion of the vehicle. Accordingly, the turning reaction force value is calculated from the lateral force, the pneumatic trail, and the geometry of the knuckle arm lengths.

The comparison unit 18 compares the estimated value of the turning reaction force calculated from the vehicle motion model as described above, and the value of the actual turning reaction force being the detected value obtained by the turning reaction force sensor 8. When the difference is less than or equal to a threshold value Fs, the comparison unit 18 adopts the estimated value from the vehicle motion model 20, and obtains the turning reaction force term of equation (5) described later. The "threshold value Fs" is set such that the estimated value is adopted in normal steering, with estimation errors allowed. When the difference between the estimated value and the detected value is greater than the threshold value, the comparison unit 18 uses the actual turning reaction force detected by the turning reaction force sensor 8 to obtain the turning reaction force term of equation (5). For example, only in emergency where the estimated value is clearly and greatly different from the detected value, the actual turning reaction force detected by the turning reaction force sensor 8 is used. When the actual turning reaction force is to be used, the signal representing the value obtained from the turning reaction force sensor 8 is caused to pass through a lowpass filter to attenuate high frequency components included in the signal, and then the turning reaction force term of the equation (5) is calculated.

$$Tr=Ks*\theta+Kd*\dot{\theta}+Ki*\ddot{\theta}+Tf+Ky*Fy \quad (5)$$

$$Tra=Ks*\theta+Kd*\dot{\theta}+Ki*\ddot{\theta}+Tf+Kz*r \quad (6)$$

Ks: spring coefficient
Kd: viscosity coefficient
Ki: inertia coefficient
Ky: turning reaction force coefficient
Kz: vehicle behavior coefficient
r: parameter representing vehicle behavior
θ: steering wheel rotation angle
θ with a dot above the letter: steering wheel rotation angular velocity
θ with two dots above the letter: steering wheel rotation angular acceleration The steering reaction force generation unit 19 uses a spring component proportional to the steering angle, a viscosity component proportional to the steering angle velocity, an inertia component proportional to the steering angle acceleration, a friction component, and a turning reaction force component, for generation of the steering reaction force. That is, the steering reaction force generation unit 19 adds the spring term being the first term in the right-hand side of equation (5) described above, the viscosity term being the second term in the right-hand side of equation (5), the inertia term being the third term in the right-hand side of equation (5), and the friction term Tf being the fourth term in the right-hand side of equation (5), to the turning reaction force term being the fifth term in the right-hand side of equation (5), thereby to output a steering reaction force Tr.

Figure 3:
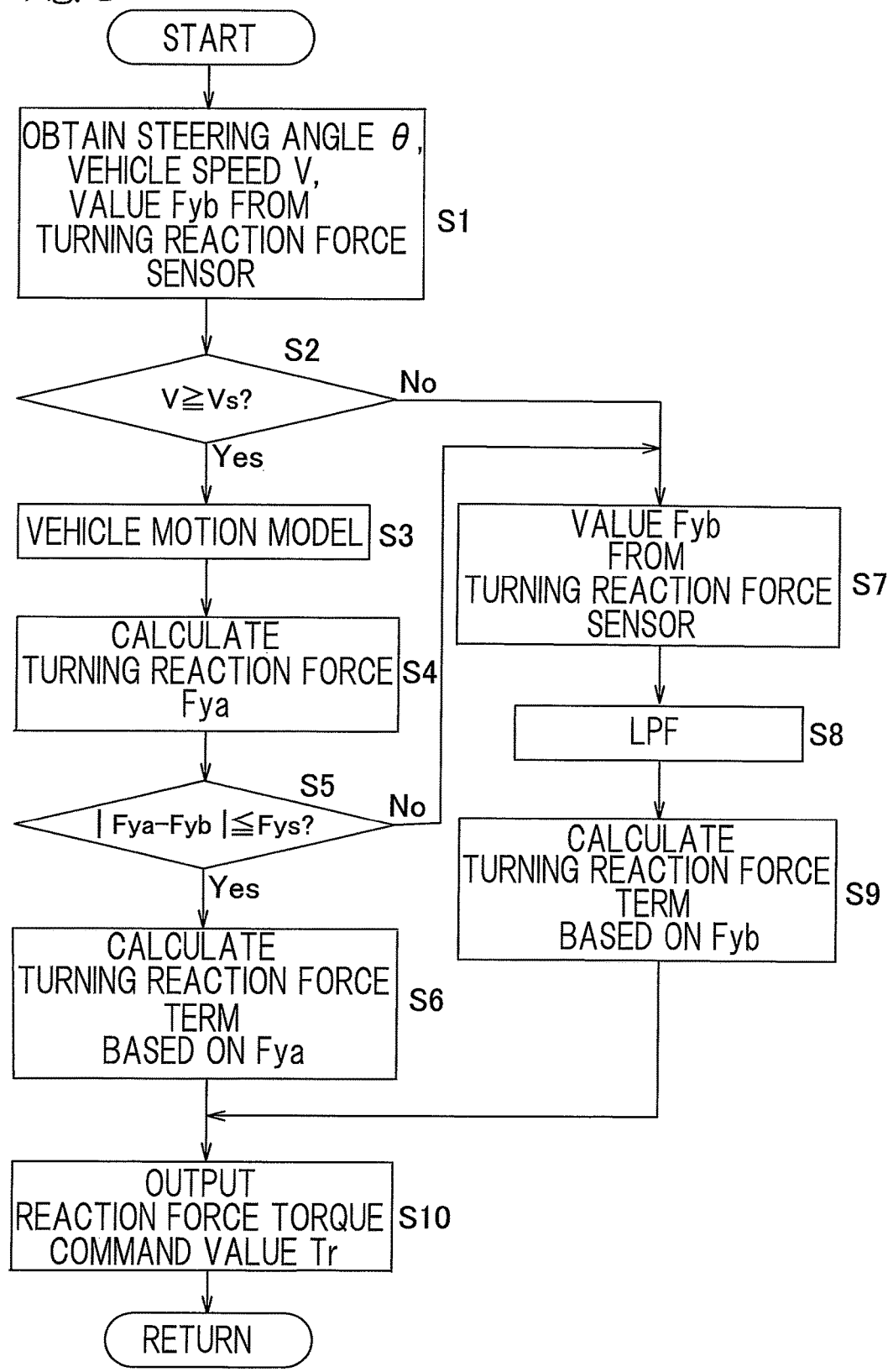
FIG. 3 is a flowchart of a process performed by steering controller in the steering reaction force control device.

FIG. 3 is a flowchart of the process performed by the steering controller 16 in the steering reaction force control device. The following description will be given also with reference to FIG. 2. For example, this process is started when the ignition of the vehicle is turned on. The process is shifted to step S1, and the steering controller 16 of the ECU 12 obtains a steering angle θ from the steering angle sensor 14, a vehicle speed V from the vehicle speed sensor 9, and a value Fyb detected by the turning reaction force sensor from the turning reaction force sensor 8. Next, in step S2, the steering controller 16 determines whether or not the obtained vehicle speed V is greater than or equal to a predetermined value Vs. When the vehicle speed is greater than or equal to the predetermined value Vs (step S2: YES), the process is shifted to step S3, and the current motion state of the vehicle is obtained from the above-described vehicle motion model 20 by the turning reaction force estimation unit 17. Then, in step S4, an estimated value Fya of the turning reaction force is calculated to be outputted.

Next, in step S5, the comparison unit 18 compares the estimated value Fya of the turning reaction force with the value of the actual turning reaction force Fyb obtained by the turning reaction force sensor 8. When the difference therebetween is less than or equal to a certain value Fys (step S5: YES), the estimated value Fya from the vehicle motion model 20 is adopted. Next, the process is shifted to step S6, and the turning reaction force term of equation (5) is obtained. Then, the process is shifted to step S10.

In step S2, when the vehicle speed is less than the predetermined value Vs (step S2: NO), or when the difference between the estimated value Fya of the turning reaction force and the value of the actual turning reaction force Fyb is greater than the threshold value Fys in step S5 (step S5: NO), the process is shifted to step S7.

In step S7, the steering controller 16 uses the value Fyb detected by the turning reaction force sensor 8. The signal representing this value Fyb detected by the turning reaction force sensor 8 is caused to pass through a lowpass filter (LPF) to attenuate high frequency components included in the signal (step S8). Next, in step S9, the turning reaction force term of equation (5) based on the value Fyb detected by the turning reaction force sensor 8 is calculated. Then, the process is shifted to step S10. In step S10, the steering reaction force generation unit 19 outputs a steering reaction force Tr as described above. Then, the process returns to step S1.

According to the steering reaction force control device described above, when the difference between the estimated value from the vehicle motion model 20 and the value detected by the turning reaction force sensor 8 is greater than or equal to a certain value, the turning reaction force detected by the turning reaction force sensor 8 is used. For example, only in emergency where the estimated value is clearly and greatly different from the detected value, the turning reaction force being the actual value detected by the turning reaction force sensor 8 is used. When the turning reaction force is to be used in a case where the vehicle speed is less than the predetermined value or in emergency where the estimated value is clearly and greatly different from the detected value as described above, the signal representing the value obtained from the turning reaction force sensor 8 is caused to pass through a lowpass filter to attenuate high frequency components included in the signal, and then, the turning reaction force term is calculated. Meanwhile, when the vehicle speed is less than a certain value as in the case of so-called steering without driving of the steering wheel 1, the movement of the steering without driving is slow movement of less than or equal to 0.5 Hz, for example. Thus, a time lag caused by the lowpass filter does not pose a problem.

The steering reaction force generation unit 19 uses the estimated value or the detected value selected by the comparison unit 18, in generation of a steering reaction force as the turning reaction force term. For generation of the steering reaction force, the turning reaction force term is used, and in addition, a spring factor proportional to the steering angle, a viscosity factor proportional to the steering angle velocity, an inertia factor proportional to the steering angle acceleration, and a friction factor are used. Since the steering angle, the steering angle velocity, and the steering angle acceleration can be obtained by the steering angle sensor 14 provided near the steering wheel, high frequency components due to vibration caused by the spring are not included therein. Thus, it is possible to realize a steer-by-wire type steering device having a stable steering reaction force which is free from influence of high frequency components included in the values obtained by the sensors and the like used for generation of the steering reaction force, and which realizes comfortable steering feeling based on the behavior state of the vehicle and the road surface state.

Each turning reaction force sensor 8 is provided to its corresponding tie rod 5, and the turning reaction force sensor 8 directly detects the force in the axial direction applied to the tie rod 5 as displacement of the load support portion, and converts the detected force into an electric signal. Thus, the feeling realized by the steer-by-wire type steering device can be made close to the feeling realized by EPS devices in which the steering wheel is mechanically connected to the tie rods-connecting shaft.

The steering reaction force generation unit 19 uses the spring component (spring term) proportional to the steering angle, the viscosity component (viscosity term) proportional to the steering angle velocity, the inertia component (inertia term) proportional to the steering angle acceleration, and the friction component (friction term), for generation of the steering reaction force. Thus, it is possible to prevent uncomfortable feeling at the time of operation of the steering wheel, vibration, and the like, and it is also possible to obtain response similar to that in the case of a conventional steering device adopting an EPS system or the like.

Other embodiments will now be described.

In the following description, when only a part of a configuration is described, the remaining part of the configuration is the same as that of the previously described embodiment. Not only combinations of parts specifically described in the embodiments, but also partial combinations of the embodiments can be made as long as such combinations cause no problem.

Figure 4:
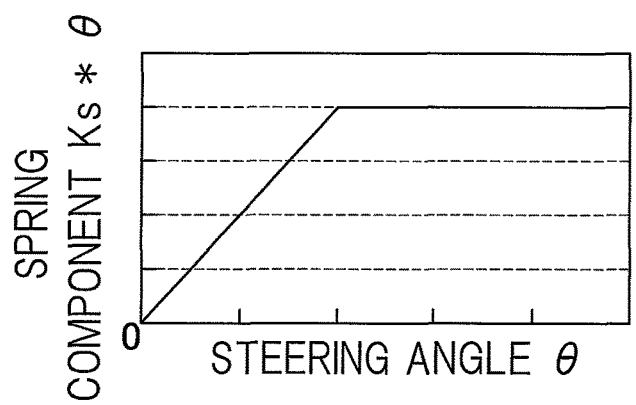
FIG. 4 shows the relationship between the turning angle and the spring component in a steering reaction force control device according to another embodiment of the present invention.

As shown in the example in FIG. 4, the relationship between the steering angle $\theta$ and the spring component ($Ks \times \theta$) may be set such that: when the steering angle $\theta$ is 0 to $\theta a$ degrees ($\theta a$ is 120 degrees, for example), a proportional relationship is kept in which the greater the steering angle $\theta$ is, the greater the spring component, i.e., the spring term, becomes; and then, when the steering angle $\theta$ is greater than or equal to $\theta a$ degrees, the spring component is made constant.

Figure 5:
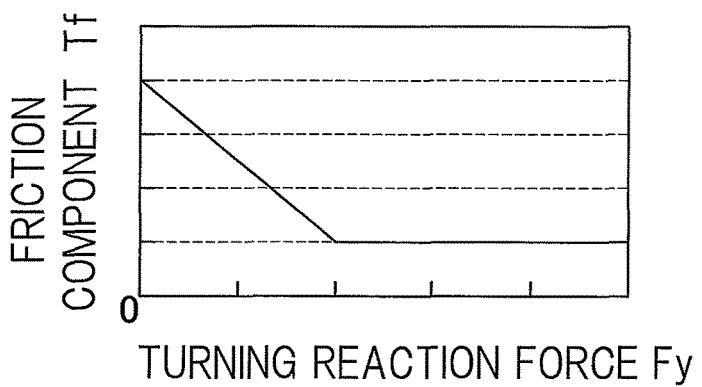
FIG. 5 shows the relationship between the turning reaction force and the friction component in a steering reaction force control device according to still another embodiment of the present invention.

As shown in the example in FIG. 5, the relationship between the turning reaction force Fy and the friction component Tf may be set such that: the greater the turning reaction force is, the smaller the friction component, i.e., the friction term, becomes; and when the turning reaction force becomes greater than or equal to a certain threshold value, the friction component is made a constant value. In this case, when the turning reaction force is small, a necessary friction component can be provided in accordance with the magnitude of the turning reaction force.

Figure 6:
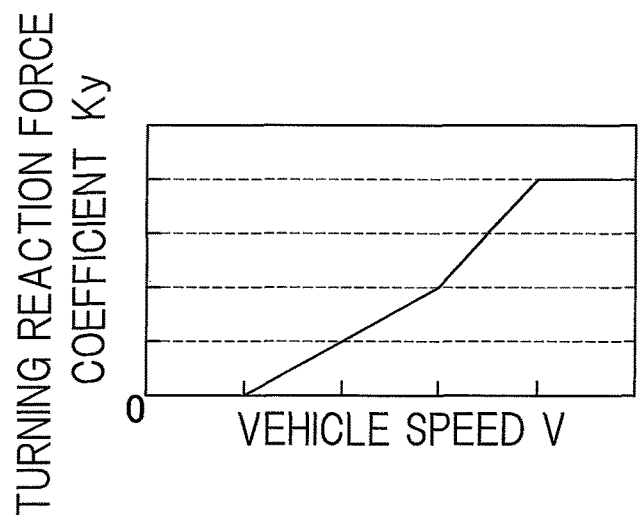
FIG. 6 shows the relationship between the vehicle speed and the turning reaction force coefficient in a steering reaction force control device according to still another embodiment of the present invention.

As shown in the example in FIG. 6, the turning reaction force coefficient Ky may be altered in response to the vehicle speed V; and when the vehicle speed is greater than or equal to a predetermined value, the turning reaction force coefficient Ky may be a constant value. In this case, for example, it is possible to obtain a more stable steering reaction force in a high speed range, and it is possible to obtain a steering reaction force that facilitates operation even with a small force in medium and low speed ranges.

The steering reaction force generation unit is configured to use the turning reaction force term obtained by multiplying a certain coefficient with the turning reaction force value estimated from the vehicle motion model 20 or the turning reaction force value detected by the turning reaction force sensor 8. However, the present invention is not limited thereto. Instead of using the turning reaction force term, a vehicle behavior term may be generated by use of any of the parameters of, for example, the yaw rate, the roll rate, the yaw angle, the roll angle, and the lateral acceleration representing vehicle behavior, which are estimated from the vehicle model 20. The vehicle behavior term is obtained by multiplying the adopted parameter representing vehicle behavior with its corresponding coefficient.

Figure 7:
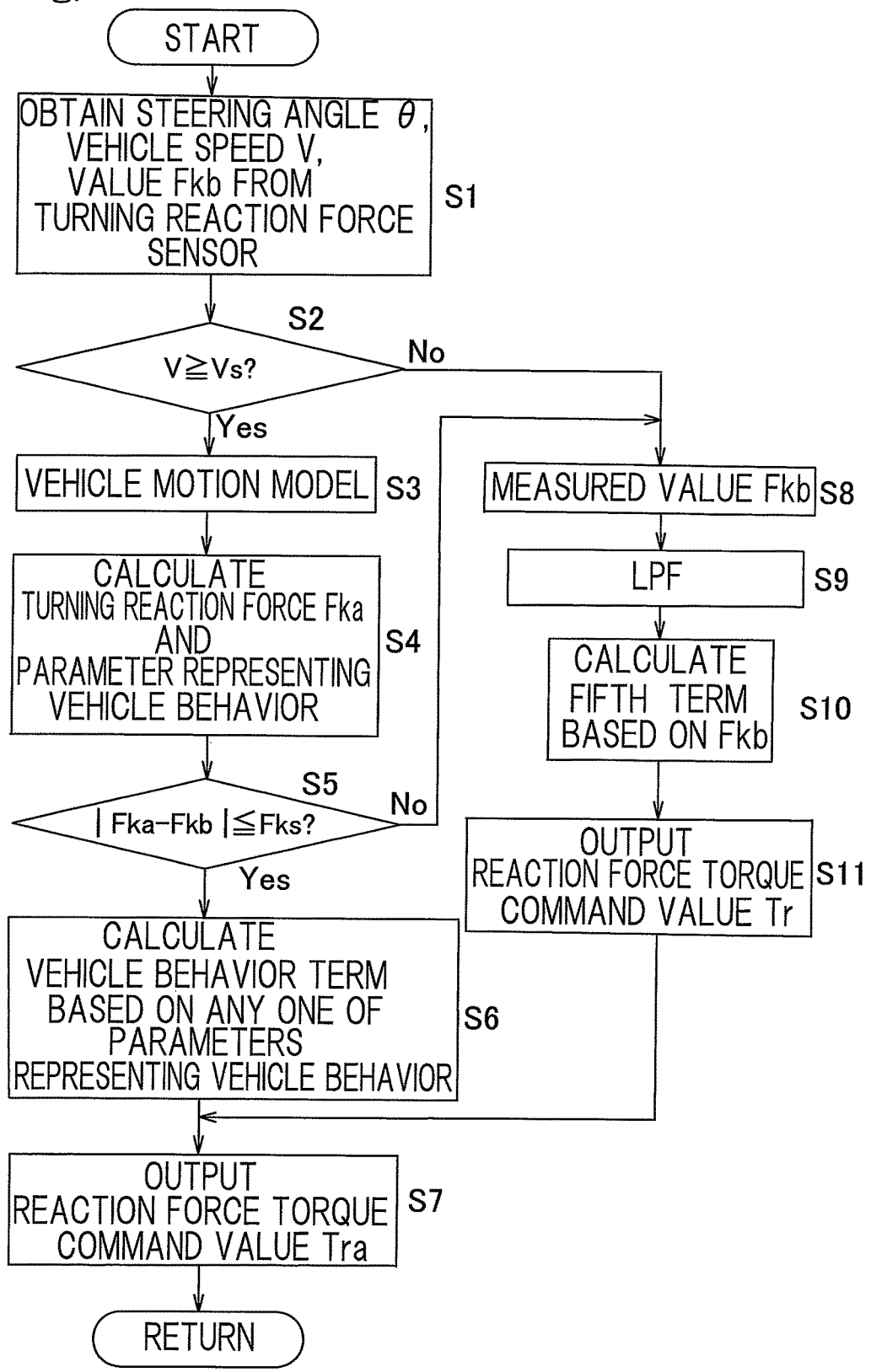
FIG. 7 is a flowchart of a process performed by steering controller in a steering reaction force control device according to still another embodiment of the present invention.

In this case, as shown in FIG. 7, in step S1, the steering angle $\theta$, the vehicle speed V, and a measured value Fkb from the turning reaction force sensor 8 are obtained. In step S2, determination regarding the vehicle speed is made in accordance with a condition, then, from the vehicle motion model 20 (step S3), an estimated value Fka of the turning reaction force and an estimated value Fkc of any of the parameters representing vehicle behavior are calculated in step S4. Then, in step S5, the comparison unit 18 compares the estimated value Fka with the measured value Fkb obtained from the turning reaction force sensor 8, and when the difference is less than or equal to a threshold value FKs, the estimated value Fkc of the parameter from the vehicle motion model 20 is adopted.

Next, the process is shifted to step S6, and the fifth term in the right-hand side of equation (6) is obtained. In this case, the fifth term in the right-hand side can be obtained by multiplying the estimated value Fkc with a coefficient corresponding to the adopted parameter. In step S7, a steering reaction force Tra obtained by adding the first term through the fifth term in the right-hand side of equation (6) is outputted. When the vehicle speed is less than the predetermined value Vs (step S2: NO), or when the difference between the estimated value Fka of the turning reaction force and the measured value Fkb from the turning reaction force sensor 8 is greater than the threshold value FKs in step S5 (step S5: NO), the process is shifted to step S8.

In step S8, the steering controller 16 uses the measured value Fkb from the turning reaction force sensor 8, and the signal representing the measured value Fkb is caused to pass through a lowpass filter to attenuate high frequency components included in the signal (step S9). Next, in step S10, the fifth term in the right-hand side of equation (5) is obtained by multiplying the measured value Fkb with its corresponding coefficient. In step S11, a steering reaction force Tr obtained by adding the first term through the fifth term in the right-hand side of equation (5) is outputted.

In the case of FIG. 7, as a parameter representing vehicle behavior, any of the yaw rate, the roll rate, the yaw angle, the roll angle, and the lateral acceleration is estimated and used as the estimated value. Therefore, vehicle behavior which could not be obtained by a conventional steer-by-wire type steering device can be outputted while being reflected in the turning reaction force. Thus, a steering device in accordance with the preference of the operator and the type or the like of the vehicle can be realized.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Steering wheel
6 . . . Tie rods-connecting shaft
7 . . . Turning mechanism
10 . . . Acceleration sensor
13 . . . Steering reaction force motor
14 . . . Steering angle sensor
15 . . . Turning motor
16 . . . Steering controller
17 . . . Turning reaction force estimation unit
18 . . . Comparison unit
19 . . . Steering reaction force generation unit
20 . . . Vehicle motion model

What is claimed is:

1. A steer-by-wire steering reaction force control device in a steer-by-wire type steering device, the steer-by-wire type steering device comprising:
a steering angle sensor configured to detect a steering angle of a steering wheel that is not mechanically connected to a tie rods-connecting shaft for turning;
a steering reaction force motor configured to provide a steering reaction force to the steering wheel; and
a steering controller configured to generate a command signal for a turning angle by combining the steering angle detected by the steering angle sensor with driving state detection signals from other sensors provided in a vehicle, so as to control a turning motor of a turning mechanism that drives the tie rods-connecting shaft,
wherein the steering controller comprises
a turning reaction force estimation unit configured to calculate an estimated value of a turning reaction force or of a parameter representing vehicle behavior based on a vehicle motion model;
a turning reaction force sensor that detects a value of a turning reaction force acting on the turning mechanism;
a comparison unit configured to compare the estimated value of a turning reaction force calculated by the turning reaction force estimation unit with the detected value detected by the turning reaction force sensor, and to select one of the estimated value of a turning reaction force and the detected value in accordance with a predetermined condition; and
a steering reaction force generation unit configured to use only one of the estimated value of a turning reaction force and the detected value selected by the comparison unit for generation of a steering reaction force.

2. The steer-by-wire steering reaction force control device as claimed in claim 1, wherein the predetermined condition is such that when a vehicle speed is greater than or equal to a predetermined value and when a difference between the estimated value and the detected value is less than or equal to a threshold value, the comparison unit will select the estimated value from the vehicle motion model, and when the condition of the vehicle speed and the difference is not satisfied, the comparison unit will select the detected value.

3. The steer-by-wire steering reaction force control device as claimed in claim 1, wherein the turning reaction force sensor is provided in the tie rods-connecting shaft or a tie rod.

4. The steer-by-wire steering reaction force control device as claimed in claim 1, wherein the steering reaction force generation unit estimates, based on the vehicle motion model, any of a yaw rate, a roll rate, a yaw angle, a roll angle, and a lateral acceleration, as the parameter representing vehicle behavior, to use the selected one as the estimated value.

5. The steer-by-wire steering reaction force control device as claimed in claim 1, wherein the steering reaction force generation unit uses any of a spring component proportional to the steering angle, a viscosity component proportional to a steering angle velocity, an inertia component proportional to a steering angle acceleration, and a friction component, for generation of the steering reaction force.

6. The steer-by-wire steering reaction force control device as claimed in claim 1, wherein the steering reaction force generation unit alters the steering reaction force in response to a vehicle speed.

* * * * *